Dec. 28, 1926.  
C. LIMPEROS  
ELECTRIC SWITCH  
Original Filed Jan. 27, 1925
1,612,033
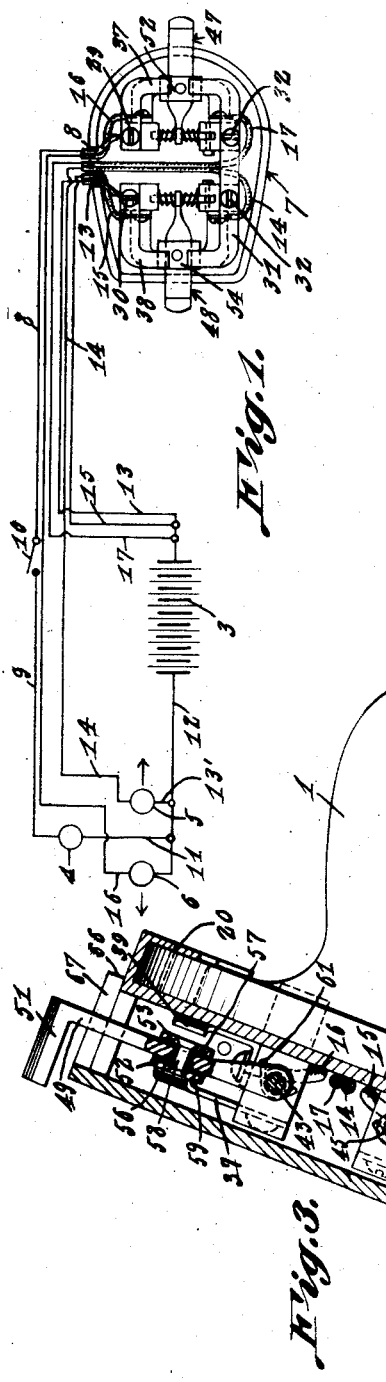
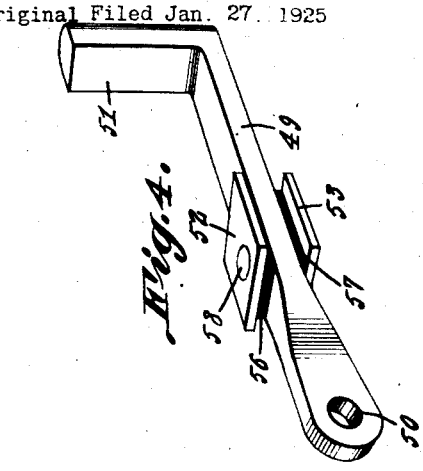
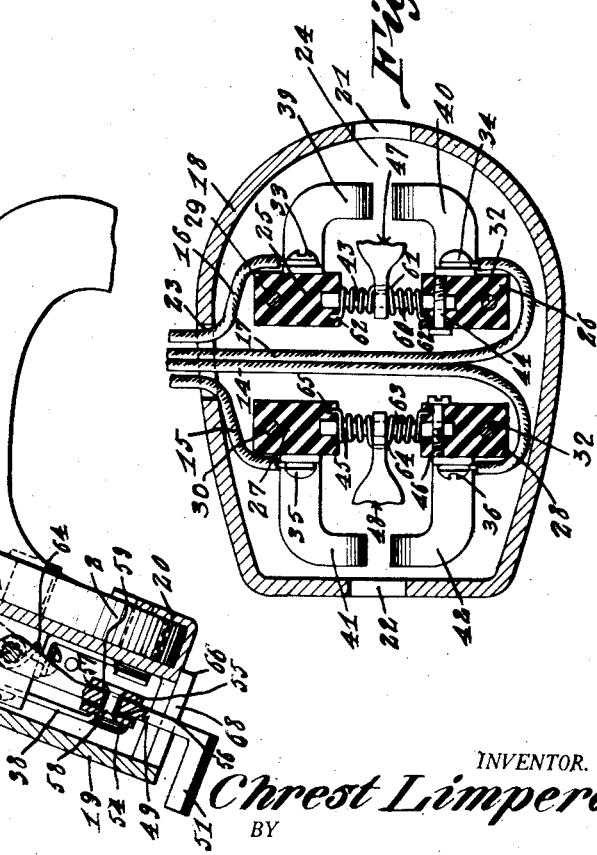
INVENTOR.  
Chrest Limperos,  
BY  
Geo. F. Kimmel.  ATTORNEY.

Patented Dec. 28, 1926.

1,612,033

UNITED STATES PATENT OFFICE.

CHREST LIMPEROS, OF WILMINGTON, DELAWARE.

ELECTRIC SWITCH.

Application filed January 27, 1925, Serial No. 5,135. Renewed August 5, 1926.

This invention relates to an electric switch, and has for its object to provide, in a manner as hereinafter set forth, a switch of such class having means to provide a normally closed electric circuit and further for simultaneously opening such normally closed circuit with the selectively closing of one of a plurality of normally open electric circuits, and although an electric switch, in accordance with this invention, is designed primarily for use in connection with the light and signal circuits of motor vehicles, it is to be understood that the switch can be employed in any connection for which it is found applicable.

A further object of the invention is to provide, in a manner as hereinafter set forth, an electric switch capable of being used in connection with a motor vehicle, and with the switch including means for normally maintaining a light circuit closed and further with means for simultaneously opening such circuit with the selectively closing of a normally open right or left turn direction light or signal circuit.

Further objects of the invention are to provide, in a manner as hereinafter set forth, an electric switch which is simple in its construction and arrangement, strong, durable, compact, thoroughly efficient and convenient in its use, readily assembled and installed and comparatively inexpensive to manufacture.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which fall within the scope of the claim hereunto appended.

In the drawings wherein like reference characters denote corresponding parts throughout the several views:

Figure 1, is a plan of an electric switch, in accordance with this invention, and further illustrating diagrammatically the several electric circuits controlled by the switch, the cover for the elements of the latter being removed.

Figure 2, is a longitudinal sectional plan of the switch illustrating the pairs of conductor members.

Figure 3 is a vertical longitudinal section of the switch.

Figure 4, is a perspective view of one of the circuit opening and closing elements.

An electric switch, in accordance with this invention, is illustrated by way of example, in connection with a foot pedal of one of the levers of a motor vehicle, as well as in connection with a right and left turn signal and parking light for the vehicle and—

Referring to the drawings, 1 indicates a pedal, 2 a foot tread, 3 a battery, 4 a parking light, 5 a right direction signal or lamp and 6 a left directing signal or lamp. The switch mechanism is referred to generally by the reference character 7 and it is adapted to control a circuit for the parking light 4, the lamp or right direction signal 5 and the lamp or left direction signal 6.

The circuit for the parking light 4 includes conductors 8 and 9 having a cut-out or switch 10 connected therewith, a conductor 11 which leads from the lamp 4 to a conductor 12 connected to one side of the battery 3. The conductor 9 leads to the lamp 4. The circuit further includes a conductor 13 which leads from the other side of the battery 3.

The circuit for the lamp 5 or right direction signal includes a conductor 13' which couples the lamp 5 with the conductor 12, a conductor 14 and a conductor 15 which extend from the conductor 13.

The circuit for the lamp 6 or left direction signal includes a conductor 12 which extends to the lamp 6, a conductor 16 which leads from the lamp 6 and a conductor 17 which extends from the conductor 13.

The conductors 8, 13, 14, 15, 16 and 17 are connected to the switch 7 in a manner as hereinafter referred to.

The switch 7 includes a casing of insulation and which consists of a body portion 18 and a flanged cover 19 and when the switch is employed in connection with the foot tread 2, the body portion is provided with bendable attaching arms 20 for the purpose of detachably connecting the casing against the tread 2, in a manner as illustrated in Figure 3. The body portion 18 at one end is slotted as at 21, and it is also slotted at its other end as at 22. One side of the body portion 18 is slotted as at 23. The slots 21 and 22 are formed for the passage of spring controlled circuit opening and closing elements, to be presently referred to, and the slot 23 is provided for the passage of the conductors 8, 13, 14, 15, 16 and 17.

Secured to the bottom 24, of the body portion 18 of the casing, at each side of its transverse center is a pair of supports. The supports of one pair are indicated at 25, 26 and the supports of the other pair at 27, 28. Connected with the support 25 is a binding post 29 and connected with the support 27 is a binding post 30. Mounted on the supports 26 and 28 is a yoke-shaped conductor member 31 and which is secured to said supports by the hold-fast devices 32.

Engaging in the outer side of the support 25 is a binding post 33, in the outer side of the support 26 is a binding post 34, in the outer side of the support 27 is a binding post 35 and in the outer side of the support 28 is a binding post 36 and the function of said binding posts will be presently referred to. Secured to the support 25, by the binding post 29 and opposing, as well as being spaced from one side of the conductor member 31, is an L-shaped conductor member 37. Secured to the support 27, by the binding post 30, and opposing, as well as being spaced from the other side of the conductor member 31, is an L-shaped conductor member 38. The conductor members 31, 37, and 38, when the spaces therebetween are bridged, in a manner as hereinafter set forth, close the circuit to the lamp or light 4 and when the switch 10 is closed, such circuit remains closed, under such conditions providing what may be termed a normally closed light or signal circuit.

The manner in which the spaces between the conductor members are bridged, to form this normally closed circuit, will be presently referred to. The binding post 29 not only secures the conductor member 37 to the support 25, but also electrically connects the conductor 8 to the member 37. The binding post 30 not only secures the conductor member 38 to the support 27, but also electrically connects the conductor 13 to the conductor member 38.

Positioned against the outer side of the support 25, as well as projecting therefrom, and secured in position by the binding post 33, is an L-shaped conductor member 39 and the said binding post 33 electrically connects the conductor 16 to the member 39. Connected to the outer side of the support 26, by the binding post 34, is an L-shaped conductor member 40, which is oppositely disposed with respect to the conductor member 39, coacts therewith and is spaced therefrom. The binding post 34 electrically connects the conductor 17 to the conductor member 40. Connected to the outer side of the support 27, by the binding post 35, is an L-shaped conductor member 41, and the said binding post 35, also electrically connects the conductor 15 to the conductor member 41. Connected to the outer side of the support 28, by the binding post 36, is an L-shaped conductor member 42, which is oppositely disposed with respect to the conductor member 41, is spaced therefrom and coacts therewith. The binding post 36 electrically connects the conductor 14 to the conductor member 42. The conductor members 39 and 40 are arranged in the lamp or right direction signal circuit 5 and the conductor members 41, 42, are arranged in the lamp or left direction signal circuit 6. The right direction or left direction signal circuit is normally open and neither one of these circuits are closed until the circuit to the lamp or light 4 is opened. The manner in which the signalling circuits are selectively closed will be presently referred to.

Arranged between the supports 25 and 26 is a supporting shaft 43, one end of which is is extended into the support 25 and the other into the support 26 and that end which extends into the support 26, is fixedly secured to the latter, by a hold-fast device 44. Arranged between the supports 27 and 28, is a supporting shaft 45, one end of which extends into the support 27 and the other end into the support 28, and that end which extends into the latter is fixedly secured therewith by a hold-fast device 46. Each of said shafts is adapted to support a spring controlled circuit opening and closing element and one of said elements is generally referred to by the reference character 47 and the other at 48. The circuit opening and closing elements extend in opposite directions with respect to each other and the element 47 projects outwardly through the slot 21 and the element 48 outwardly through the slot 22. Each of said elements includes an arm 49, having its inner end formed with an opening 50 and its outer end with a vertical extension 51 to facilitate the shifting of the element by the foot or by the hand. The extensions 51, when the elements 47 and 48 are mounted in position, project above the top of the cover 19, see Figure 3. The element 47, intermediate the ends of its arm 49, is provided with a pair of superposed spaced contact plates 52, 53 and the element 48, intermediate the ends of its arm 49, is provided with a pair of superposed spaced contact plates 54, 55. The plate 52 or 54 is arranged over the top of its respective arm 49, extends transversely with respect thereto and is insulated therefrom as at 56. The plate 53 or 55 is arranged below its respective arm, extends transversely with respect thereto and is insulated therefrom as at 57. The contact plates are rectangular in contour, and each pair of contact plates is secured to its respective arm by a rivet 58 and the latter is insulated from the arm 49, as indicated at 59. The contact plates 52 and 54 coact together and simultaneously bridge the spaces between the conductor members 31, 37 and 38, as well as engage therewith, for the purpose of normally closing the circuit to the lamp or light 4. The contact plate 53 is adapted to bridge the space between the conductor members 39 and 40, as well as contact therewith, for the purpose of closing the circuit to the lamp or signal 5. The contact plate 55 bridges the space between the conductor members 41 and 42, as well as contacting therewith, for the purpose of closing the circuit to the lamp or signal 6. The contact plate 53 is normally out of engagement with the conductor members 39 and 40 and the contact plate 55 is normally out of engagement with the conductor members 41 and 42. The circuit to the lamp or signal 5 is closed independently of the circuit to the lamp or signal 6. The contact plates 52 and 54 are normally in engagement with the conductor members 31, 37 and 38 and are arranged below said conductor members and are maintained in normal engagement with said members through the medium of the controlling springs for the circuit opening and closing elements 47, 48. The controlling spring for the element 47, is indicated at 60, extends through the inner end of said element as at 61, and has its ends connected to the supports 25, 26 as at 62. The spring 60 is mounted on the shaft 43. The controlling spring for the element 48 is indicated at 63, extends through the inner end of said element 48, as at 64, and has its ends secured to the supports 27, 28, as at 65. The spring 63 is mounted on the shaft 45.

The flange or rim 66 of the cover 19, is slotted as at 67, 68 for the passage of the elements 47, 48 respectively.

When the switch 10 is closed, the circuit to the lamp 4 is also closed, in view of the fact that the contact plates 52, 54 are held in engagement with its conductor members 31, 37, 38 by the controlling springs of the elements 47 and 48 and said circuit remains closed, until either one of said elements is depressed. It does not require the depressing of both of said elements to open the circuit to the lamp or light 4. If it be desired to close the circuit to the lamp or signal 5, the element 47 is depressed, which opens the circuit to the lamp or light 4, and closes the circuit to the lamp or signal 5, in view of the fact that the contact plate 53 is brought into engagement with the conductor members 39 and 40. After the element 47 is released, the circuit to the lamp or light 4 is automatically closed. When it is desired to close the circuit to the lamp or signal 6, the element 48 is depressed, so that the plate 55 will contact with the conductor members 41, 42, under such conditions closing the circuit to the lamp or signal 6 and when said element 48 is depressed the circuit to the lamp or light 4 is opened and said latter circuit is automatically closed when the element 48 is released.

It is thought that the many advantages of an electric switch, in accordance with this invention can be readily understood, and although the preferred embodiment of the invention is as illustrated and described, yet it is to be understood that changes in the detail of construction can be had which will fall within the scope of the invention as claimed.

By arranging the switch on the pedal, the driver of an automobile can set a desired signal, without removing his hands from the steering mechanism, and furthermore if the switch is connected to the brake pedal the direction signal can be set on the application of the brake without the driver removing his hands from the steering mechanism.

What I claim is:—

A switch comprising a set of three spaced conductor members, two spaced pair of conductor members arranged below and spaced from said set, a pair of shiftable spring controlled, oppositely extending circuit opening and closing elements normally in circuit closing position and each provided with a pair of superposed spaced contact plates, one of said contact plates of each pair normally engaging with said set of conductor members for normally closing such circuit, and the other contact plate of each pair coacting with a pair of conductor members to close one of a plurality of circuits simultaneously with the opening of the first mentioned circuit when an element carrying such contact plate is shifted from normal position, one of the members of said set being yoke-shaped, one pair of contact plates arranged below said yoke-shaped and one of the other of the conductor members of said set and above one of the pair of conductor members and the other pair of contact plates arranged below said yoke-shaped and the remaining one of the conductor members of said set and above the other pair of conductor members.

In testimony whereof, I affix my signature hereto.

CHREST LIMPEROS.